(12) United States Patent
Hong

(10) Patent No.: US 9,137,318 B2
(45) Date of Patent: Sep. 15, 2015

(54) METHOD AND APPARATUS FOR DETECTING EVENTS INDICATIVE OF INAPPROPRIATE ACTIVITY IN AN ONLINE COMMUNITY

(75) Inventor: Jack L. Hong, Cupertino, CA (US)

(73) Assignee: Avaya Inc., Basking Ridge, NJ (US)

( * ) Notice: Subject to any disclaimer, the term of this patent is extended or adjusted under 35 U.S.C. 154(b) by 1465 days.

(21) Appl. No.: 12/355,137

(22) Filed: Jan. 16, 2009

(65) Prior Publication Data

US 2009/0182872 A1    Jul. 16, 2009

Related U.S. Application Data

(60) Provisional application No. 61/021,475, filed on Jan. 16, 2008.

(51) Int. Cl.
*G06F 15/173* (2006.01)
*H04L 29/08* (2006.01)
*G06T 13/40* (2011.01)
*H04L 29/06* (2006.01)

(52) U.S. Cl.
CPC .............. *H04L 67/22* (2013.01); *G06T 13/40* (2013.01); *H04L 29/06* (2013.01); *H04L 63/1416* (2013.01); *H04L 63/30* (2013.01); *H04L 67/306* (2013.01); *H04L 67/38* (2013.01)

(58) Field of Classification Search
USPC .............. 709/223, 227, 229; 715/706; 705/76
See application file for complete search history.

(56) References Cited

U.S. PATENT DOCUMENTS

| 8,555,164 | B2* | 10/2013 | Huang et al. ................... 715/706 |
| 2003/0004897 | A1* | 1/2003 | Smith, IV ........................ 705/76 |
| 2004/0250210 | A1* | 12/2004 | Huang et al. ................... 715/706 |
| 2007/0282621 | A1* | 12/2007 | Altman et al. ..................... 705/1 |
| 2007/0282623 | A1* | 12/2007 | Dattorro | |
| 2008/0281622 | A1* | 11/2008 | Hoal ................................ 705/1 |
| 2009/0182872 | A1* | 7/2009 | Hong ............................ 709/224 |
| 2009/0299925 | A1* | 12/2009 | Ramaswamy et al. .......... 706/12 |
| 2010/0174813 | A1* | 7/2010 | Hildreth et al. ............... 709/224 |

OTHER PUBLICATIONS

Penna, L; Clark, Andrew; Mohay, George. "Challenges of Automating the Detection of Paedophile activity on the Internet" Proceedings of the First International Workshop on Systematic Approaches to Digital Forensic Engineering (SADFE '05) 0-7695-2478-8/05 2005.
Bernhardt, T; Vasseur, A., "Esper: Event Stream Processing and Correlation" Published on http://www.onjava.com Mar. 8, 2007.
Anon, "EsperTech—Esper: Event Stream and Complex Event Processing" http://web.archive.org/web/20080102185445/http://esper.codehaus.org.

* cited by examiner

*Primary Examiner* — Khanh Dinh
(74) *Attorney, Agent, or Firm* — Muncy, Geissler, Olds & Lowe, P.C.

(57) ABSTRACT

A method of detecting events in a computer-implemented online community includes providing a computer-implemented event processor, providing the computer-implemented event processor with a description of at least one event to be detected, automatically analyzing messages of the online community with the computer-implemented event processor to detect the at least one event, and issuing a notification of a detected event. Also an apparatus for carrying out the method.

36 Claims, 4 Drawing Sheets

FIG. 2

| POTENTIALLY INAPPROPRIATE REQUEST OR WORD |
|---|
| HOW OLD ARE YOU? |
| ARE YOU A BOY OR A GIRL? |
| WHERE DO YOU LIVE? |
| VISIT |
| MEET |
| GET TOGETHER |
| [ANY NAME OF CITY OR TOWN] |
| [USER EDITABLE ADDITIONS] |

FIG. 3

USER PROFILES

| ACCOUNT NUMBER | GENDER | AGE | LOCATION |
|---|---|---|---|
| 0001 | FEMALE | 14 | WASHINGTON, DC |
| 0002 | MALE | 16 | FAIRFAX, VA |
| 0003 | MALE | 40 | BOSTON, MA |
| 0004 | FEMALE | 13 | BOSTON, MA |
| 0005 | MALE | 35 | PHILADELPHIA, PA |
| 0006 | FEMALE | 36 | BALTIMORE, MD |

HISTORY OF USER 0001

| DATE | RECIPIENT | TEXT |
|---|---|---|
| 12/05/08 | 0004 | ARE YOU A BOY OR A GIRL? |
| 12/05/08 | 0004 | WHERE DO YOU LIVE? |
| 12/05/08 | 0004 | I LIVE IN WASHINGTON, DC. HAVE YOU EVER BEEN TO WASHINGTON? |
| 12/05/08 | 0004 | HI UNCLE MIKE. I HOPE WE CAN GET TOGETHER WHEN YOU COME TO WASHINGTON AT CHRISTMAS. |

HISTORY OF USER 0005

| DATE | RECIPIENT | TEXT |
|---|---|---|
| 12/10/08 | 0006 | WHERE DO YOU LIVE? |
| 12/10/08 | 0006 | YOU LIVE IN BALTIMORE? THAT'S NOT TOO FAR FROM PHILADELPHIA. HOW ABOUT COMING UP HERE FOR A VISIT? OR WE COULD GET TOGETHER DOWN IN BALTIMORE FOR DINNER AND DRINKS. |
| 12/10/08 | 0001 | HI JANE - YES, I'LL BE IN DC THE WHOLE WEEK AFTER CHRISTMAS AND I'M LOOKING FORWARD TO SEEING YOU AND YOUR FATHER. |

*FIG. 5*

HISTORY OF USER 0003

| DATE | RECIPIENT | TEXT |
|---|---|---|
| 12/01/08 | 0001 | ARE YOU A BOY OR A GIRL? |
| 12/01/08 | 0001 | HOW OLD ARE YOU? |
| 12/01/08 | 0006 | HOW OLD ARE YOU? |
| 12/01/08 | 0002 | ARE YOU A BOY OR A GIRL? |
| 12/01/08 | 0002 | WHERE DO YOU LIVE? |

*FIG. 6*

METHOD AND APPARATUS FOR DETECTING EVENTS INDICATIVE OF INAPPROPRIATE ACTIVITY IN AN ONLINE COMMUNITY

CROSS-REFERENCE TO RELATED APPLICATIONS

The present application claims the benefit of U.S. Provisional Patent Application No. 61/021,475, filed Jan. 16, 2008, the entire contents of which are hereby incorporated by reference.

FIELD OF THE INVENTION

The present invention is directed to a computer implemented method and apparatus for automatically detecting events indicative of inappropriate activity in an online community and providing a notification when such events are detected, and, more specifically, to a computer implemented method and apparatus for automatically detecting events indicative of inappropriate activity between adults and minor children in an online community and providing a notification when such events are detected.

BACKGROUND OF THE INVENTION

Social networking sites and online virtual communities continue to grow in popularity. Social networking sites, such as MySpace.com and Facebook.com, allow users to post and view messages and personal information and to communicate with groups of persons who have common backgrounds or who share common interests. The amount of personal information is controllable to an extent by the user, but basic information about individuals can be obtained fairly readily, based on membership in particular groups, for example. The profiles of users posted on these sites are generally expected to correspond more or less to actual persons. However, it is sometimes possible to create fictitious user profiles that allow one person to pose as another, a man as a woman or an adult as a child, for example.

Currently popular virtual communities include Second Life and various massively multiplayer online role playing games (MMORPG) such as World of Warcraft and RuneScape. These games and communities allow participants to control on-screen avatars that can interact and speak, via typed messages in a speech bubble, for example, with the avatars of other players. Many of these communities have policies requiring participants to disclose their age, and the communities either deny access to minors or limit their access to certain features of the community. However, it can be difficult to ensure that participants are in fact the age they claim to be, especially in environments where people often endow their avatars with characteristics quite different than those of the players themselves.

The phrase "online community" will be used herein to describe both social networks such as MySpace.com and FaceBook.com and virtual worlds such as Second Life as well as similar online communities in which participants can interact with one another in an anonymous or semi-anonymous manner.

Online communities offer many benefits for their users. However, because they often attract minor children, they can also provide a tempting target for pedophiles and others seeking to communicate with minor children for inappropriate or illegal reasons. Pedophiles are a significant problem for online communities, and many online communities take measures to detect and/or prevent pedophiles from interacting with children. (The term "pedophile" is used herein as a catch-all description of adults seeking inappropriate and/or illegal contact or communication with children even if the communications are not sexual in nature or the person otherwise does not meet a clinical definition of a "pedophile.") Some online communities employ teams of monitors who read ongoing dialog in the virtual community to look for inappropriate conversations. However, this is expensive and far from foolproof since individuals can become distracted or bored, or they may miss subtle clues that suggest an inappropriate conversation. Limited filtering may also be employed to stop the use of profanity or predetermined unacceptable words; however, this too is not a suitable tool for detecting inappropriate activities, especially those that may legally occur between consenting adults and which should not be entirely filtered from a community. It would therefore be desirable to provide an automated, computer-implemented system and apparatus for detecting events in an online community that suggest inappropriate activity so that the persons involved in such activity can be monitored and/or reported to the appropriate legal authorities.

SUMMARY OF THE INVENTION

These problems and others are addressed by various embodiments of the present invention, a first aspect of which comprises a method of detecting events in a computer-implemented online community. The method includes providing a computer-implemented event processor and providing the computer-implemented event processor with a description of at least one event to be detected. The method also includes automatically analyzing messages of the online community with the computer-implemented event processor to detect the at least one event and issuing a notification of a detected event.

Another aspect of the invention comprises a method of detecting a possible pedophile in a computer-implemented online community. The method includes providing a computer-implemented event processor and providing the computer-implemented event processor with a description of events indicative of pedophile activity. The method also includes automatically analyzing data streams of the online community to detect those events and issuing a notification of a detected event.

A further aspect of the invention comprises an apparatus that includes a computer-implemented event processor, a mechanism for providing the computer-implemented event processor with message data from an online community and a mechanism for providing the computer-implemented event processor with a description of at least one event to be detected. The computer-implemented event processor is configured to automatically analyze messages of the online community to detect the at least one event and issue a notification if the event is detected.

Yet another aspect of the invention comprises an apparatus that includes a computer-implemented event processor, a mechanism for providing the computer-implemented event processor with message data from an online community, and a mechanism for providing the computer-implemented event processor with a description of events indicative of pedophile activity. The computer-implemented event processor is configured to automatically analyze data streams of the online community to detect the events and issue a notification of a detected event.

Yet a further aspect of the invention is an article of manufacture that includes a computer usable medium having a computer readable code means embodied therein for causing a computer to detect events in an online community. The computer readable code in the article of manufacture includes code for implementing an event processor, code describing at least one event to be detected, code for causing the event processor to automatically analyze messages of the online community to detect the at least one event and code for issuing a notification of a detected event.

Another aspect of the invention is an article of manufacture that includes a computer usable medium having a computer readable code means embodied therein for causing a computer to detect events indicative of pedophile activity in an online community. The computer readable code in the article of manufacture includes code for implementing an event processor, code for describing at least one event indicative of pedophile activity to be detected, code for automatically analyzing data streams of the online community to detect the at least one event, and code for issuing a notification that the at least one event has been detected.

BRIEF DESCRIPTION OF THE DRAWINGS

These and other aspects and features of embodiments of the invention will be better understood after a reading of the following detailed description of presently preferred embodiments of the invention together with the attached drawings, wherein, FIG. 1 schematically illustrates a system for detecting events in an online community according to an embodiment of the present invention;

FIG. 2 is a table of potentially inappropriate words and requests that may be used by the system of FIG. 1;

FIG. 3 is a table of user profiles that may be used by the system of FIG. 1;

FIG. 4 is a table containing a message history of one of the users identified in the table of FIG. 3;

FIG. 5 is a table containing a message history of another of the users identified in the table of FIG. 3;

FIG. 6 is a table containing a message history of another of the users identified in the table of FIG. 3;

DETAILED DESCRIPTION

Figure 1:
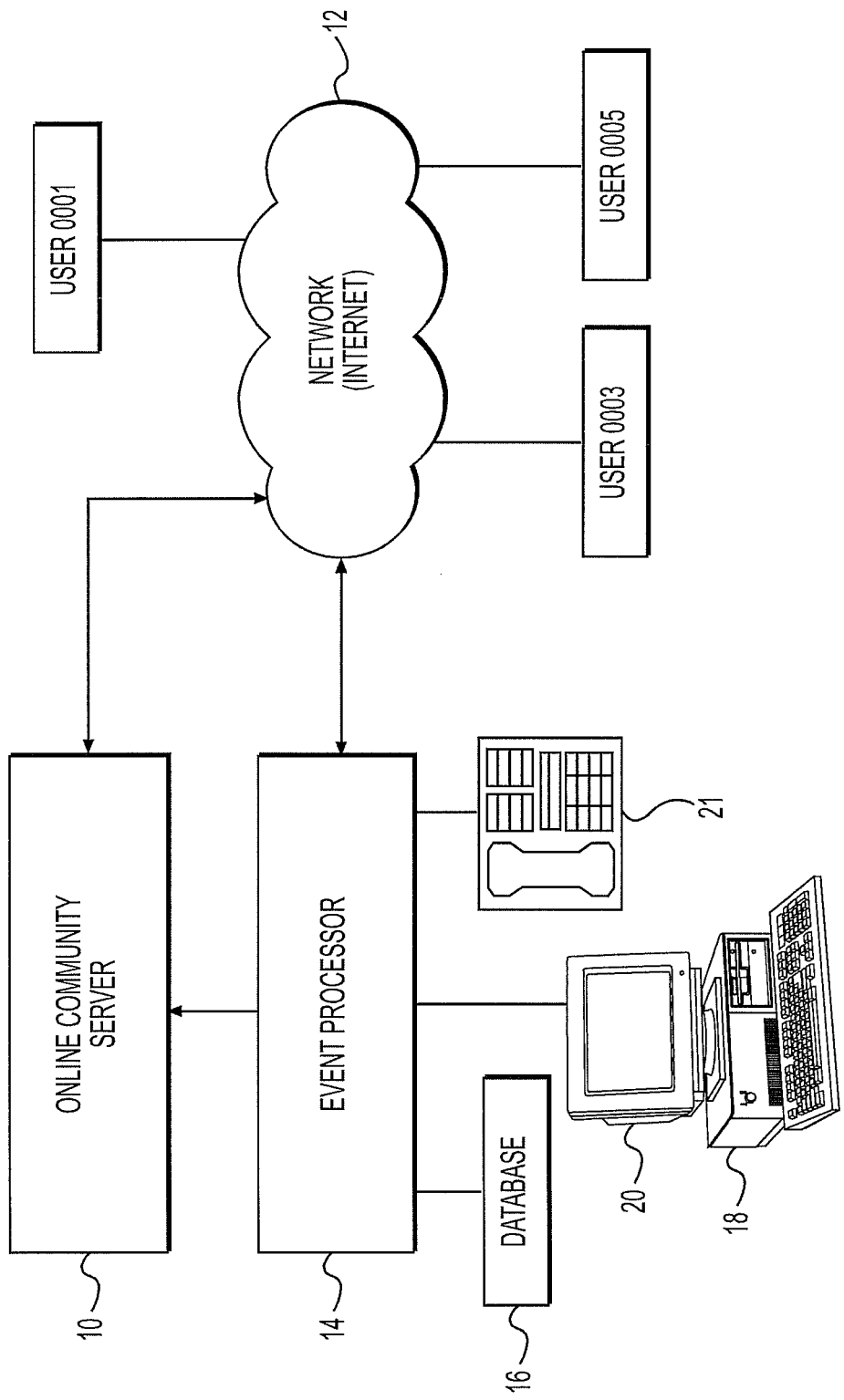

Referring now to the drawings, wherein the showings are for the purpose of illustrating presently preferred embodiments of the invention only and not for purposes of limiting same, FIG. 1 illustrates an online community server 10 which provides the functionality of an online community to users via a network such as the internet 12. The users receive data representing aspects of the online community from server 10 and send data to server 10 to personalize their presence in the online community. Users also send and receive messages to other users by communicating with the online community server 10. According to an aspect of the present invention, all data sent from users to the online community server 10, or at least all messages to other users of the online community, are scanned by event processor 14 before reaching online community server 10 for purposes that will be discussed in more detail below.

While the online community server 10 is illustrated as a single element in FIG. 1, those skilled in the relevant arts will appreciate that a plurality of servers may be used to host such on online community or that various functions of an online community may be hosted in different locations. FIG. 1 is intended to schematically illustrate that, regardless of how the actual online community is implemented, user-to-user message traffic of the online community will be evaluated by event processor 14.

Event processor 14 is a computer implemented-apparatus capable of scanning streaming data in real time and analyzing that data to detect various predetermined events. A suitable product is sold as the Avaya Event Processor by Avaya, Inc. of Basking Ridge, N.J. Another event processors is the Esper product, a complex event processor available from EsperTech of Wayne N.J. The event processor may be connected to a database 16 and controlled via a personal computer 18 having a monitor 20 or a similar interface. While embodiments of the invention contemplate real-time scanning of data, it may also be possible to copy and buffer data for later analysis if conditions or data volumes make it difficult to perform real time evaluation at all times.

In the past, teams of people were sometimes employed to monitor the message traffic of various online communities. However, many online communities have millions of members, and it can be difficult or impossible to read every word that is typed by users. Moreover, even if every word were read, human monitors cannot know the contents of all past messages from various users. Communications that are inappropriate by themselves may be noted, but a multiplicity of communications between two users or originating from a single user may only appear inappropriate if considered in their entirety or in context. Thus a pedophile could easily evade detection by refraining from any such comments that appear suspicious when considered alone.

With the monitoring system of embodiments of the present invention, events are defined in the event processor 14 and notifications are provided when these events are detected. Notification can be provided by way of email or output on a computer monitor 20 or, when used with suitable telecommunications products such as the Communications Process Manager product from Avaya, Inc., by telephone 21 to suitable individuals. The notifications can identify the event that was satisfied and provide access to the messages and criteria that triggered the event detection. The event detection process is described below.

Event processor 14 operates by monitoring data streams and looking for words or phrases that occur under one or more predetermined conditions. These conditions may include the presence of certain words or phrases in the data stream, the source of various messages that comprise the data stream, the time that the message was received, other messages that were detected within a given time interval, and information from database 16. Various examples of events that may trigger a notification are discussed below in connection with profiles of several fictitious users and histories of communications sent by those users. The number of users and lengths of the message histories are provided for illustration purposes only. In reality, thousands of messages from each of millions of users would likely be monitored.

FIG. 2 is a table containing a number of potentially inappropriate requests or words. As illustrated in the table, these requests may include requests for the gender or age of another user or words or phrases that suggest one user is attempting to arrange an in-person meeting with another user. These requests and phrases are described as "potentially" inappropriate because in many cases, the requests show normal communication between users of the online community. Other criteria making up an event must therefore be satisfied before a notice of inappropriate activity is generated. Of course, the foregoing requests are merely representative, and administrators of various online communities, or law enforcement organizations with experience in monitoring suspected pedophiles, can add to the list to more specifically define events that warrant further investigation.

FIG. 3 is a table of user profiles and includes a first column 22 with a user identification number, a second column 24 with the gender of the user, a third column 26 with the age of the user and a fourth column 28 with the geographical location of the user. Many online communities collect such information, and where more detailed profiles are provided, information in addition to that illustrated in FIG. 3 may be considered when detecting events. The profiles of the users are considered by event processor 14 when determining whether an event is satisfied. The ages of the sender and recipient of a given message, for example, may help determine the whether a message is inappropriate or not. Thus, a sexually themed message from one adult to a second adult (based on the ages of the sender and recipient in the profiles of the table in FIG. 3) would not satisfy the conditions of an event whereas the same message from an adult to a minor would cause a notification to be issued. As will be appreciated, even a fairly obvious example of activity to be detected would be difficult for a human monitor to detect in real time. The message might appear to be a potential problem, but until the monitor checked various database to determine the ages of the sender and recipient, for example, it could not be determined whether the message was inappropriate.

With the system of embodiments of the present invention, however, events can be detected that would be difficult or impossible to detect by human monitoring. FIG. 6, for example, discloses a portion of a message history of messages that were sent by user 0003. As can be seen from user 0003's profile in of FIG. 3, user 0003 is a 40 year old male from Boston. On a single day, user 0003 sent a number of messages that included potentially inappropriate words or phrases from the table of FIG. 2 to three different members of the online community. Of course, an actual history would likely include many more entries. However, an event can be defined as requiring detection of more than a given number of potentially inappropriate messages in a given time period or that more than a given percentage of communications from a user comprise potentially inappropriate words or phrases. Therefore, if the event conditions for detecting a potential pedophile included 1) a communication from an adult to a minor that 2) includes potentially inappropriate requests or words and 3) that occurs more than a given number of times in a given time period, and an event would be detected on Dec. 1, 2008, based on the communications of user 0003. Of course, the system of the present invention merely provides notifications that human review is necessary; there may be cases where such review determines that no further action is needed. Therefore, the conditions defining an event can be set to be somewhat over-inclusive to allow a human monitor to make the final decision without fear that overly restrictive definitions of an event will miss activity that might be indicative of communications from a pedophile.

User 0003 identified himself as being 40 years old in his profile. When a user identifies himself as an adult, a first set of conditions, such as those discussed above, can be used to detect inappropriate communications between an adult and a minor. However, a pedophile might create a user account that shows him to be another minor so that communications between the pedophile and minors will appear to be unremarkable. It therefore also may be desirable to define events that are not dependent upon the age of the message sender. Thus, if the message history of FIG. 6 had been sent by a user who was identified as a minor, an event might still be detected because the number of questions relating to the gender of the recipient does not seem consistent with normal conversations between minors. Thresholds can be established for the different conditions that make up an event so that, for example, two communications about gender from a self-identified adult to a minor might trigger an event while four communications regarding gender from a self-identified minor to a minor might be required before triggering an event. These threshold levels may be freely established depending on the number of false positive and false negative identifications that are found to occur in the particular setting where this embodiment of the present invention is practiced.

FIG. 4 illustrates a portion of the message history of user 0001, a fourteen year old female from Washington, D.C. While the first three communications in the representative message history contain potentially inappropriate words or requests, these messages are being sent from one minor to another minor. They therefore would not satisfy predefined event criteria and would not require review by a human monitor. The fourth message in the table is between a minor and an adult, identifies the city in which the minor lives, and includes the potentially inappropriate phrase "get together" from the table of FIG. 2. However, a review of the contents of the message suggests that it is between two relatives and is therefore unlikely to require review. While it may be difficult to define events in a manner that excludes communications between adult and minor relatives, setting a threshold that allows, for example, one such message a day to pass without triggering an event will reduce the number of such occurrences that require human review.

FIG. 5 provides a further example of messages sent by user 0005, a 35 year old male, that include potentially inappropriate words or phrases, namely a the phrase "where do you live" and a discussion about an in-person meeting. The message also shows communications between this adult and a minor, namely user 0001. The messages containing the potentially inappropriate phrases were sent to a user who is an adult and therefore would not trigger an event. The message sent to the minor includes a geographical location (DC). However, as long as a threshold is set to allow a small number of such messages, these communications would not trigger the generation of an event or a notification. If user 0005 happened to send multiple communications to relatives who were minors within a given period of time, the user's message history might be flagged for review, but a quick review would most likely suggest no further monitoring was needed.

Once an event is detected, a notification is generated either by providing a notification on a monitor 20 associated with the event processor or by sending a message to an administrator responsible for the online community. If upon review of the messages, it appears that they include inappropriate communications between an adult and a minor, law enforcement would generally be notified. At that stage, further events can be defined to assist law enforcement with the monitoring. For example, once a user of the service has been identified for further investigation, an event can be defined as any communication between that user and a minor, without regard to the presence of potentially inappropriate phrases.

The event processor will generally monitor communications in real time. However, it is also possible to use the event processor to analyze communications saved in a database. This might be useful, for example, after a potential pedophile is identified based on real-time message. Law enforcement could then analyze all prior messages sent by that person for more specific events, such as all communications with minors. The system of embodiments of the present invention can also be used to supplement current monitoring methods, such as the use of so-called "honeypots," or fictitious users who are set up to be targets of pedophiles or persons of interest. A honeypot that appears to be a minor who readily gives out information about that minor's geographic location, may be monitored with different conditions that other real users. Of course, the use of honeypots and other types of searches discussed herein must be designed to comply with all applicable laws and the terms of service of the online communities in which they are implemented. However, the present system provides a useful tool to detect and identify potential pedophiles in an efficient manner.

Figure 7:
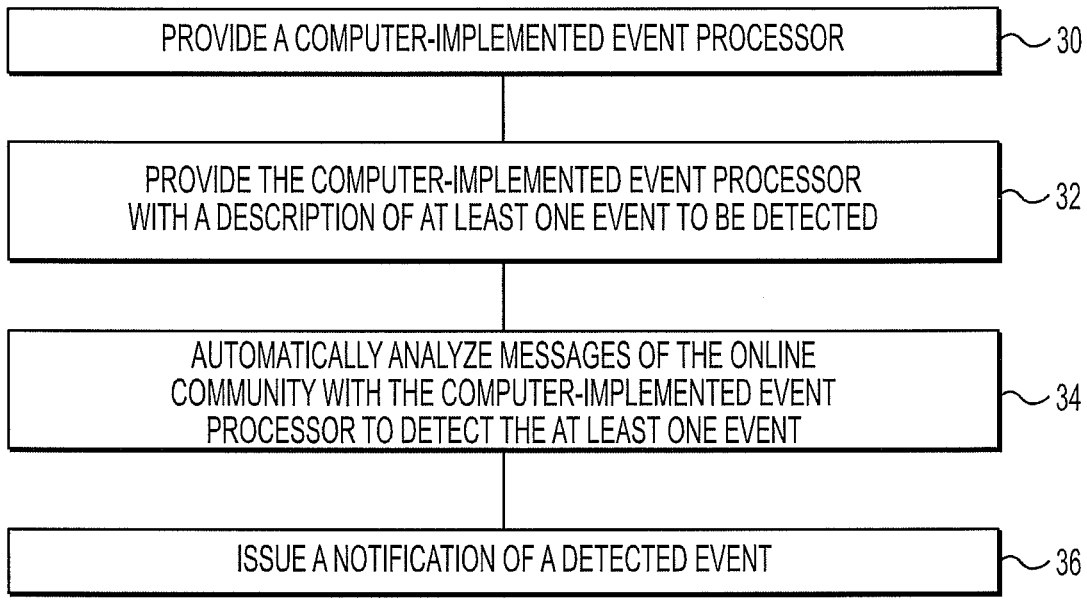
FIG. 7 is a flow chart illustrating a first method according to an embodiment of the present invention.

FIG. 7 illustrates a method of detecting events in an online community according to an embodiment of the present invention. The method includes providing a computer-implemented event processor at a step 30, providing the computer-implemented event processor with a description of at least one event to be detected at a step 32, automatically analyzing messages of the online community with the computer-implemented event processor to detect the at least one event at a step 34 and issuing a notification of a detected event at a step 36.

Figure 8:
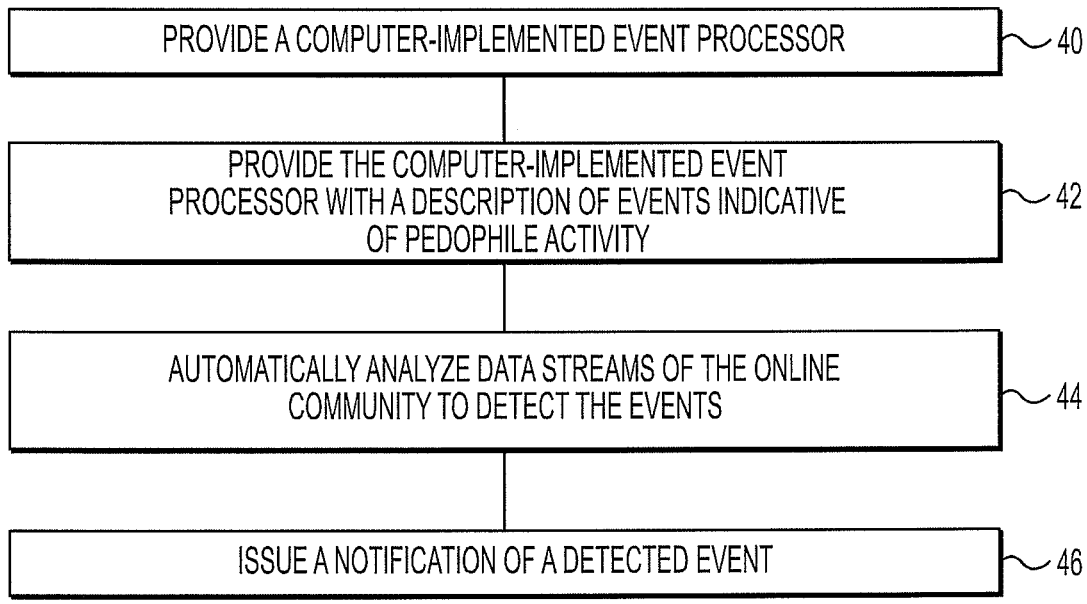
FIG. 8 is a flow chart illustrating a second method according to an embodiment of the present invention.

FIG. 8 illustrates a method of detecting a possible pedophile in a computer-implemented online community according to an embodiment of the present invention that includes providing a computer-implemented event processor at a step 40, providing the computer-implemented event processor with a description of events indicative of pedophile activity at a step 42, automatically analyzing data streams of the online community to detect the events at a step 44 and issuing a notification of a detected event at a step 46.

The present invention has been described herein in terms of several embodiments. Various additions and modifications to these embodiments will become apparent to those of ordinary skill in the art upon a reading of the foregoing description. It is intended that all such modifications and additions comprise a part of the present invention to the extent they fall within the scope of the several claims appended hereto.

I claim:

1. A method of detecting events in a computer-implemented online community comprising:
    providing a computer-implemented event processor;
    providing the computer-implemented event processor with a description of at least one event to be detected;
    automatically analyzing messages of the online community with the computer-implemented event processor to detect the at least one event; and
    issuing a notification of the detected at least one event,
    wherein providing a computer-implemented event processor comprises providing a computer processor configured to receive a stream of data and determine that the at least one event has occurred only when a plurality of conditions, including at least one condition based on the content of the stream of data, have been satisfied.

2. The method of claim 1 wherein the computer-implemented event processor is configured to analyze the data in real time.

3. The method of claim 1 wherein the at least one condition includes a question regarding a person's age.

4. The method of claim 3 wherein the at least one condition includes a question about a person's gender.

5. The method of claim 1 wherein the at least one condition comprises a request for an in-person meeting.

6. The method of claim 1 wherein providing a computer-implemented event processor comprises providing a computer processor configured to receive a stream of data and search for predetermines strings of data in real time.

7. The method of claim 1 wherein the messages include data identifying a sender of the messages and including analyzing a database of user profiles to select a first set of users and wherein the event to be detected comprises a string of data from a user in the first set of users.

8. The method of claim 1 wherein the messages include data identifying a sender of the messages and wherein the event to be detected comprises a plurality of data strings generated by a given sender in a plurality of messages.

9. The method of claim 1 wherein the online community comprises a social networking site.

10. The method of claim 1 wherein the online community comprises a virtual world.

11. The method of claim 1 wherein the online community comprises a massively multiplayer role-playing game.

12. A method of detecting a possible pedophile in a computer-implemented online community comprising:
    providing a computer-implemented event processor;
    providing the computer-implemented event processor with a description of events indicative of pedophile activity;
    automatically analyzing data streams of the online community to detect the events;
    issuing a notification of a detected event,
    identifying all messages generated by a given user, determining an age of the given user, and determining ages of the recipients of messages from the given user and wherein automatically analyzing data streams of the online community to detect the events comprises analyzing the data streams to detect when the age of the given user is greater than a first age and the ages of the recipients of messages from the given user are less than a second age.

13. The method of claim 12 including detecting in the data streams of the online community potentially inappropriate requests, said potentially inappropriate requests being selected from the group consisting of requests for a person's age, requests for a person's gender, and requests for an in-person meeting.

14. The method of claim 12 including detecting in the data streams of the online community potentially inappropriate words, said potentially inappropriate words being selected from the group consisting of words related to an in-person meeting and words identifying a geographic location.

15. The method of claim 13 including identifying all messages generated by a given user and wherein detecting an event comprises detecting more than a given number of potentially inappropriate requests in the messages generated by the given user.

16. The method of claim 13 including identifying all messages generated by a given user and wherein detecting an event comprises detecting that more than a given proportion of the all messages generated by a given user comprise potentially inappropriate requests.

17. The method of claim 12 wherein the online community comprises a social networking site.

18. The method of claim 12 wherein the online community comprises a virtual world.

19. The method of claim 12 wherein the online community comprises a massively multiplayer role-playing game.

20. An apparatus comprising:
    a computer-implemented event processor;
    means for providing the computer-implemented event processor with message data from an online community; and
    means for providing the computer-implemented event processor with a description of at least one event to be detected, the event comprising first and second conditions being satisfied, the first condition being based on the message data;

wherein the computer-implemented event processor is configured to automatically analyze messages of the online community to detect the at least one event and issue a notification only when the first and second conditions have been satisfied.

21. The apparatus of claim 20 wherein the means for providing the computer-implemented event processor with a description of at least one event comprises a database in communication with the computer-implemented event processor storing the description of the at least one event.

22. The apparatus of claim 20 wherein the computer-implemented event processor comprises a computer processor programmed to receive a stream of data and search for predetermines strings of data in real time.

23. The apparatus of claim 20 including a database storing information used by the event processor when determining whether messages of the online community comprise an event.

24. An article of manufacture comprising a non-transitory computer usable medium having a computer readable code means embodied therein for causing a computer to detect events in an online community, the computer readable code in said article of manufacture comprising:
- computer readable code means for implementing an event processor;
- computer readable code means describing at least one event to be detected;
- computer readable code means for causing the event processor to automatically analyze messages of the online community;
- computer readable code means for causing the event processor to issue a notification only when at least two conditions related to a given message have been satisfied.

25. An article of manufacture comprising a computer usable medium having a computer readable code means embodied therein for causing a computer to detect events indicative of pedophile activity in an online community, the computer readable code in said article of manufacture comprising:
- computer readable code means for implementing an event processor;
- computer readable code means describing at least one event indicative of pedophile activity to be detected;
- computer readable code means for automatically analyzing data streams of the online community to detect the at least one event;
- computer readable code means for identifying all messages generated by a given user;
- computer readable code means for determining an age of the given user, and determining ages of the recipients of messages from the given user; and
- computer readable code means for issuing a notification that the at least one event has been detected,
- wherein automatically analyzing data streams of the online community to detect the events comprises analyzing the data streams to detect when the age of the given user is greater than a first age and the ages of the recipients of messages from the given user are less than a second age.

26. A method of detecting events in a computer-implemented online community comprising:
- automatically analyzing messages from at least one sender to at least one recipient with a computer-implemented event processor;
- detecting words or phrases in the messages potentially indicative of inappropriate activity;
- detecting an aggravating condition; and
- issuing an event notification based on the detected words or phrases only if the aggravating condition is also detected.

27. The method of claim 26 wherein the aggravating condition comprises information from a user profile of the at least one recipient.

28. The method of claim 26 wherein the aggravating condition comprises information from a user profile of the at least one sender.

29. The method of claim 26, wherein the aggravating condition comprises information regarding previous actions of the at least one sender.

30. The method of claim 26 wherein issuing an event notification comprises issuing a notification to a person other than the at least one sender and the at least one recipient.

31. The method of claim 1, including identifying a message associated with the at least one detected event, wherein issuing a notification comprises sending a notification message to an address that is not an address of a sender of the message associated with the at least one detected event and that is not an address of a designated recipient of the message associated with the at least one detected event.

32. The method of claim 12, including identifying messages associated with the detected events, wherein issuing a notification comprises sending a notification message to an address that is not an address of a sender of the messages associated with the at least one detected event and that is not an address of a designated recipient of the messages associated with the at least one detected event.

33. The apparatus of claim 20, wherein the computer-implemented event processor is further configured to identify a message associated with the at least one event to be detected and to send a notification message to an address that is not an address of a sender of the message associated with the at least one event to be detected and that is not an address of a designated recipient of the message associated with the at least one event to be detected.

34. The article of manufacture of claim 24, wherein the computer readable code means for causing the event processor to issue a notification comprises computer readable code means for causing the event processor to send a notification message identifying the given message to an address that is not an address of a sender of the given message and that is not an address of a designated recipient of the given message.

35. The article of manufacture of claim 25, wherein the computer readable code means for issuing a notification comprises computer readable code means for sending a notification message to an address that is not an address of the given user and that is not an address of one of the recipients of said all messages.

36. The method of claim 26, including identifying a message including the detected words or phrases, wherein issuing an event notification comprises sending a notification message to an address that is not an address of the at least one sender and that is not an address of the at least one recipient.

* * * * *